2. DISTILLATION. Examin

48

Sept. 21, 1937. P. VAN ACKEREN Re. 20,515

COKE OVEN DOOR Orig. 2,072,537

Original Filed Dec. 5, 1930 2 Sheets-Sheet 1

Inventor:
Paul van Ackeren
by
Henry Lee Clarke
his Atty.

02. DISTILLATION.
248

Examin

Sept. 21, 1937. P. VAN ACKEREN Re. 20,515

COKE OVEN DOOR

Original Filed Dec. 5, 1930 2 Sheets-Sheet 2

Inventor:
Paul van Ackeren
by Henry Lee Clarke
his Atty.

202. DISTILLATION.
248

Exami

Reissued Sept. 21, 1937

Re. 20,515

UNITED STATES PATENT OFFICE 20,515

COKE OVEN DOOR

Paul Van Ackeren, Essen, Germany, assignor, by mesne assignments, to Koppers Company, a corporation of Delaware Original No. 2,072,537, dated March 2, 1937, Serial No. 500,221, December 5, 1930. Renewed December 16, 1935. Application for reissue May 14, 1937, Serial No. 142,689. In Germany December 9, 1929

12 Claims. (Cl. 202—248)

My invention relates to improvements in the construction and operation of the doors of coke ovens, i. e. the doorlike coverings for the mouths of the coking chambers.

It is an object of my invention to provide means whereby the joint between such a door and the mouth of the coking chamber of a coke oven can be sealed in different ways in a particularly simple and efficient manner.

The invention has particular reference to the type of coke oven doors, in which resilient sealing means connected with the movable door are arranged to cooperate with the metal jacket covering the brickwork on either side of the mouth of the coking chamber to automatically seal the joint between the door and said mouth whenever the door is inserted in the coking chamber and fixed in position in front of the oven.

It is an object of my invention to provide means whereby coke oven doors of this type can easily and in a simple manner be converted into the ordinary type of doors, in which the joints between the door and the oven are sealed by means of some suitable packing material, such as loam or the like, so that one and the same door can alternatively be used as a self-sealing door and according to the sealing method in use prior to the introduction of self-sealing doors.

In the drawings affixed to this specification and forming part thereof a coke oven door construction embodying my invention is illustrated diagrammatically by way of example.

In the drawings

Figure 1:
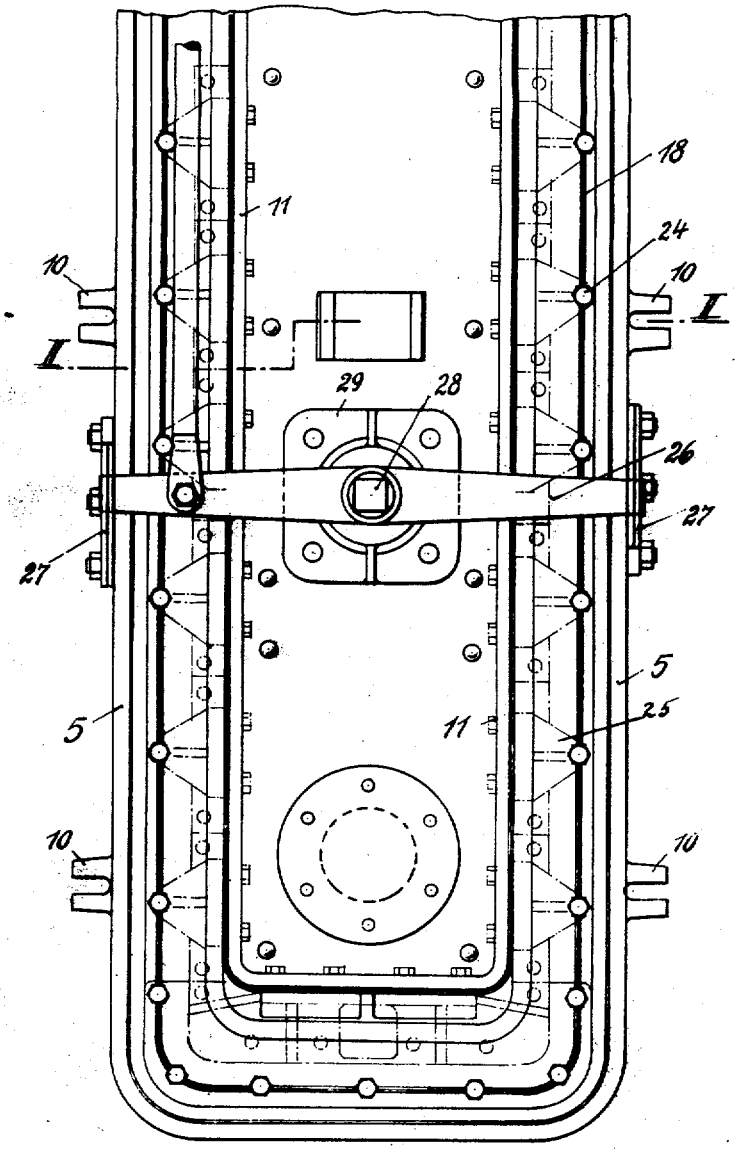
Fig. 1 is a front elevation of the greater part of the door and the metal frame surrounding same.
Figure 2:
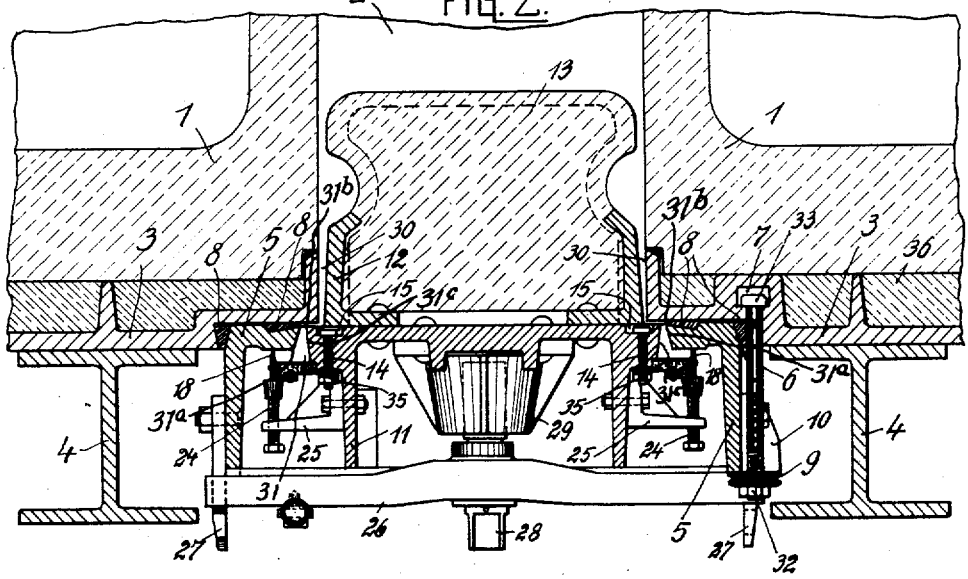
Fig. 2 is a horizontal cross section on the line II—II in Fig. 1.
Figure 3:
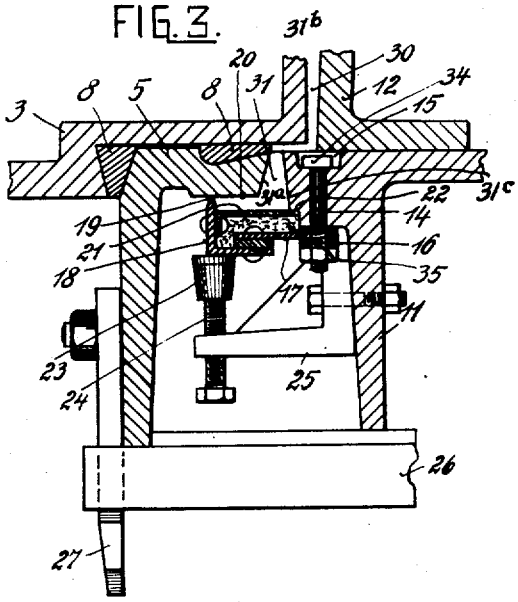
Fig. 3 is an enlarged view of a portion of Figure 2 showing the gap, between the door and the oven, and also suitable means for automatically sealing same.
Figure 4:
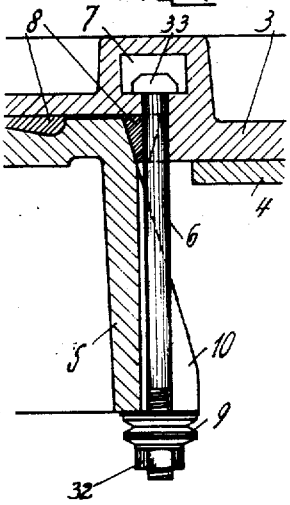
Fig. 4 is an enlarged view of a portion of Figure 2 showing the means employed for connecting up resiliently the metallic oven covering with the door frame.

Referring to the drawings, 1 is the brickwork constituting the coke oven structure and 2 is one of the coking chambers. 3 is the metal covering mounted on an insulating layer 36 covering the brickwork 1 on either side of the mouth of the coking chamber. 4 are the usual buckstays of the oven. 5 is the metallic door frame of L-shaped cross section surrounding the mouth of the coking chamber and held in position on the metallic oven covering 3 by means of tie bolts 6 projecting into cavities 7 provided in the metal covering. 8, 8 are packing strips of some suitable material, such as asbestos, slag-wool or the like, inserted between the door frame 5 and the metal covering 3. 9 are conical spring washers inserted between the nuts 32 of the bolts 6 and the fork-shaped brackets 10 projecting from the frame 5, the bolts 6 being retained in the cavities 7 by their heads 33 and the nuts 32 mounted thereon holding the frame 5 firmly applied against the metal covering, the conical spring washers 9 serving to hold the frame down under elastic pressure.

11 is the door proper having a substantially H-section in horizontal cross-section, the part 12 of the door, which projects into the coking chamber, serving to hold the refractory brick lining 13 in position on the door. 14 are tie bolts extending through holes in the outer rim of the door, the heads 34 of these bolts retaining them in these holes. By means of these bolts 14 a sealing frame 17 of resilient metal sheet or the like is fixed on the door with the interposition of washers 16. To the frame 17 is fixed the pressure frame 18 of L-shaped cross section, the free edge 19 of which bears against the surface of the inwardly extending portion of the door frame 5. On the inner wall of the pressure frame 18 is mounted another resilient sheet metal frame 21, the inner edge portion of which applies itself against a shoulder 22 formed on the circumference of the door. Packing material, such as asbestos, slag-wool or the like is inserted in the annular cavity between the door 11, the pressure frame 18 and the elastic sheet metal frames 17 and 21. Screw bolts 24 mounted in angular brackets 25 fixed to the door 11 serve for pressing the edge portion 19 of the pressure frame 18 by means of adjustable heads 23 against the seating surface 20 of the door frame.

The width of the door proper 11 being substantially less than the inner width of the door frame 5 and the adjoining edge portions of these two parts being beveled the door and the door frame are formed to provide a three sided sealing channel 31 of conical cross-section with channel sides 31*a* and 31*c* and narrow channel end 31*b* forming spaced sealing surfaces on the door and frame to form a luting channel to receive luting material in its channel space 31, which, when the self-sealing means 17, 18, and 21, have been removed by withdrawing the bolts 14, may be filled with loam by smearing, as was hitherto the practice, the loam then forming a seal prevening the escape of gases and condensates from the coking chamber.

The door can be fixed in position in the mouth of the coking chamber by means of cotter-bars 26 extending into hook-shaped members 27 mounted on the door frame, a screw spindle 28 extending across each cotter-bar and having its inner end applied against a projection 29 on the door serving to adjustably hold the door in position.

Obviously this door construction allows using the door either as a self-sealing door, the pressure frame 18 forming the self-sealing member proper being resiliently connected with the door proper and being adjustably pressed in sealing engagement against the surface 20 of the door frame by the bolts 24 automatically upon the fixing of the door in place by the cotter-bars 26, the packing 35 inserted between the resilient frames 17 and 21 serving to fully prevent the escape of gases and condensate between the pressure frame 18 and the door proper.

Or, on the bolts 14 being removed from the door, the automatic sealing means including the elastic frames 17, 21 and pressure frame 18 can be disengaged from the door which can then be sealed in the old manner by filling the gap 31 with loam or the like.

The door frame 5 may be formed as an annular casting of considerable strength. It is mounted in front of the oven covering proper 3 and connected therewith in such manner that a bending of the oven covering and of the buck stays 4 would not influence the door frame, the spring washers 9 sufficing to take up all stresses.

The door proper is somewhat wider than the mouth of the coking chamber, the gap conical cross section which is formed between the door and the door frame being adapted to receive a loam packing and to be effectually sealed thereby.

The door frame being mounted on the outside of the oven is effectually secured against heating and substantially no thermic strains are transmitted onto it.

Obviously the two resilient sheet metal frames 17 and 21 guarantee a tight resilient contact between the edge portion 19 of the pressure frame 18 and the surface 20 of the door frame.

The resilient fixation of the pressure frame 18 further prevents the sensitive insulating layer 36 inserted between the brickwork structure of the oven and the metal covering 3 from being damaged by the insertion or removal of the door. This insulating layer may be made very thick without the elastic seal being in any way influenced thereby.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:

1. A coke oven closure comprising a door to cover the mouth of a coking chamber, a door frame fixed to said oven and surrounding said door with a clearance, means for holding said door in position in front of said coking chamber, automatically active sealing means for sealing the space between said door and said frame and means removably connecting said sealing means with said door, said sealing means comprising a pressure frame, a sheet metal frame removably mounted on said door and supporting said pressure frame, another sheet metal frame fixed to said pressure frame and in freely movable engagement with said door and packing material filling the space between said frames.

2. A coke oven closure comprising a door to cover the mouth of a coking chamber, a door frame fixed to said oven and surrounding said door with a clearance, means for holding said door in position in front of said coking chamber, automatically active sealing means for sealing the space between said door and said door frame and means removably connecting said sealing means with said door, said connecting means comprising screw bolts extending through holes in said door and fixing said resilient frame in position thereon, said sealing means comprising a resilient metal frame surrounding said door, a pressure frame of L-section fixed to said resilient frame, another sheet metal frame fixed to said pressure frame and packing material filling the space between said frames, and adjustable pressure screw bolts arranged on said door with their inner ends bearing against said pressure frame to adjust the same relative to said door frame.

3. A coke oven closure comprising a door to cover the mouth of a coking chamber, a door frame fixed to said oven and surrounding said door with a clearance, means for holding said door in position in front of said coking chamber, spaced sealing surfaces on said door and said frame, the sealing surface on the door overlapping the frame transversely of the doorway and forming with the sealing surface on the frame a three sided sealing channel V-shaped in cross-section and adapted to receive luting material to seal the space between the door and the frame, a knife-edge seating-surface separate from the three sides of the V-shaped channel and surrounding the V-shaped channel optionally operable automatically active sealing means operable alternatively to the three sided luting channel, for automatically sealing the three sided channel between said door and said frame, and means for displacing the automatically active sealing means for alternative sealing of the door by luting of the three sided channel, said automatically active sealing means comprising a pressure frame having a knife-edge and a sheet metal frame for supporting the pressure frame on said door and maintaining the knife-edge in seating relation with the separate seating-surface therefor.

4. A closure particularly for a coke oven, comprising a door frame, a door body adapted to fit against the door frame with a slight clearance and having guide means therein around the edge of the door, a metallic rigid packing member with a base portion mounted against lateral movement in the guide means of the door body and having a knife edge adapted to tightly contact against the door frame, said metallic packing member being L-shaped wherein the vertical part thereof has the knife edge and the horizontal part is the base portion, means contacting against the side of the vertical part of the packing member to prevent lateral movement and means in the door body for adjusting the member by means of the base portion from the door body against the frame in a direction parallel to the axis of the oven to expose the smallest possible surface between the door frame and body to the gases in the oven.

5. In a closure structure for doorways of horizontal coke-oven chambers having an outer reenforcing structure comprising buck-stays for the oven brickwork alongside the doorway and metal jacket covering for the outer brickwork of the ovens on either side of the doorway, with the metal covering interposed between the buck-stays and the brickwork, a removable metal door-frame extending around the doorway and having a continuous seat for a metal-to-metal seal of a self-sealing door and having portions in abutting engagement with the metal covering so as to form a removable metallic facing for the edges of the doorway, for removal at will; and detachable means for anchoring the door-frame in place comprising adjustable tieing connections between the door-frame and the outer reenforcing structure, each such connection comprising opposite engaging faces, one of which engages said door-frame and the other of which engages said outer reenforcing structure, and means for drawing down on both engaging faces simultaneously to hold the removable door-frame tied on and firmly applied to the metal covering.

6. In a closure structure for doorways of horizontal coke-oven chambers having outer reenforcing structure comprising buck-stays for the oven brickwork alongside the doorway and metal jacket covering for the outer brickwork of the ovens between the doorways and interposed between the buck-stays and the brickwork; a removable metal door-frame extending around the doorway and having a continuous seat for the metal-to-metal seal of a self-sealing door and having portions in abutting engagement with the metal covering so as to form a removable metallic facing, for the edges of the doorway, for removal at will; and detachable means for anchoring the metal door-frame in place comprising adjustable tieing connections between the door-frame and the aforesaid metal covering part of the outer reenforcing structure, each such connection comprising opposite engaging faces, one of which engages said door-frame, and the other of which directly engages the said metal covering, and means for drawing down on both engaging faces simultaneously to draw together the door-frame and metal covering to firmly apply the removable door-frame independently of the buck-stays.

7. In a closure structure for doorways of horizontal coke-oven chambers having outer reenforcing structure comprising buck-stays for the oven brickwork alongside the doorway and metal jacket covering for the outer brickwork of the ovens between the doorways and interposed between the buck-stays and the brickwork; a removable metal door-frame extending around the doorway and having a continuous seat for the metal-to-metal seal of a self-sealing door and having portions in abutting engagement with the metal covering so as to form a removable metallic facing, for the edges of the doorway, for removal at will; and detachable means for anchoring the metal door-frame in place comprising adjustable tieing connections between the door-frame and the aforesaid metal covering part of the outer reenforcing structure, each such connection comprising a screw bolt seated directly on the said metal covering and in tieing engagement with the door-frame for drawing the door-frame and said metal covering directly together during tightening of the said screw bolts, to firmly apply the removable door-frame independently of the buck-stays.

8. In a closure structure for doorways of horizontal coke-oven chambers having outer reenforcing structure comprising buck-stays for the oven brickwork alongside the doorway and metal jacket covering for the outer brickwork of the ovens between the doorways and interposed between the buck-stays and the brickwork; a removable metal door-frame extending around the doorway and having a continuous seat for the metal-to-metal seal of a self-sealing door and having portions in abutting engagement with the metal covering so as to form a removable metallic facing, for the edges of the doorway, for removal at will; and detachable means for anchoring the metal door-frame in place comprising adjustable tieing connections between the door-frame and the aforesaid metal covering part of the outer reenforcing structure, each such connection comprising opposite engaging faces, one of which engages said door-frame and the other of which directly engages the said metal covering, and yieldable means for offering elastic pressure within the tieing connection, and means for drawing down on both said engaging faces simultaneously to draw together the door-frame and the metal covering to firmly apply the removable door-frame independently of the buck-stays.

9. In a closure structure for doorways of horizontal coke-oven chambers having an outer reenforcing structure comprising buck-stays for the oven brickwork alongside the doorway and metal jacket covering for the outer brickwork of the ovens on either side of the doorway, with the metal covering interposed between the buck-stays and the brickwork; a removable metal door-frame extending around the doorway and having a continuous seat for a door-seal and having portions in abutting engagement with the metal covering so as to form a removable metallic facing for the edges of the doorway, for removal at will; and detachable means for anchoring the door-frame in place comprising adjustable tieing connections between the door-frame and the outer reenforcing structure, each such connection comprising opposite engaging faces, one of which engages said door-frame and the other of which engages said outer reenforcing structure, and means for drawing down on both engaging faces simultaneously to hold the removable door-frame tied on and firmly applied to the metal covering.

10. In a closure structure for doorways of horizontal coke oven chambers having an outer reenforcing structure around the doorway, a door-frame having continuous sealing-surface means for both a luted seal and a metal-to-metal seal; a door for said frame having both a luting sealing-means and an adjustable automatic sealing-means comprising pressure frame with a vertical part having a knife-edge and with means contacting the sides of the vertical part to prevent lateral movement for optional cooperative sealing relationship with the continuous sealing-surface means of the door frame; the aforesaid luting sealing means comprising a peripheral surface on the door overlapping the outer reinforcing structure, and a surrounding surface on the door frame surrounding the peripheral surface on the door so as to form therewith a V-shaped channel for holding luting material; detachable means for anchoring the door-frame removably on the outer reinforcing structure comprising adjustable tieing connections between the door-frame and the outer reinforcing structure for adjustment of the door frame on the outer reinforcing structure to maintain conformity of the sealing surface on the sealing door frame with the automatic sealing means therefor on the door, each such connection comprising opposite engaging faces, one of which engages said door-frame and the other of which engages said outer reinforcing structure, and means for drawing down on both engaging faces simultaneously to hold the removable door-frame tied on and firmly applied to the metal covering; and detachable means for removably anchoring the door on the door-frame with either of the sealing means on the door in place for sealing relationship with the sealing means therefor on the door-frame.

11. In a closure structure for doorways of horizontal coke-oven chambers having an outer reenforcing structure comprising buck-stays for the oven brickwork alongside the doorway and metal jacket covering for the outer brickwork of the ovens on either side of the doorway, with the metal covering interposed between the buck-stays and the brickwork; a removable metal door-frame extending around the doorway and having a continuous seat for a metal-to-metal seal of a self-sealing door and having portions in abutting engagement around the doorway so as to form a removable metallic facing for the edges of the doorway, for removal at will; and detachable means for anchoring the door-frame in place comprising adjustable tieing connections between the door-frame and the outer reenforcing structure, each such connection comprising opposite engaging faces, one of which engages said door-frame and the other of which engages said outer reenforcing structure, and means for drawing down on both engaging faces simultaneously to hold the removable door-frame tied on and firmly applied around the doorway.

12. In a closure structure for doorways of horizontal coke-oven chambers having an outer reenforcing structure comprising buck-stays for the oven brickwork alongside the doorway and metal jacket covering for the outer brickwork of the ovens on either side of the doorway, with the metal covering interposed between the buck-stays and the brickwork; a removable metal door-frame extending around the doorway and having a continuous seat for a door-seal and having portions in abutting engagement around the doorway so as to form a removable metallic facing for the edges of the doorway, for removal at will; and detachable means for anchoring the door-frame in place comprising adjustable tieing connections between the door-frame and the outer reenforcing structure, each such connection comprising opposite engaging faces, one of which engages said door-frame and the other of which engages said outer reenforcing structure, and means for drawing down on both engaging faces simultaneously to hold the removable door-frame tied on and firmly applied around the doorway.

PAUL VAN ACKEREN.